United States Patent Office 3,207,722
Patented Sept. 21, 1965

3,207,722
VULCANIZING UNSATURATED POLYOLEFIN ELASTOMERS WITH CARBON BLACK AND FRIEDEL-CRAFTS CATALYSTS
Charles Edwin Kendall, Coleshill, Robert Anthony William Longdon, Acocks Green, Birmingham, John William Watson, Sutton Coldfield, and Philip Stanley Smethem, Streetly, England, assignors to Dunlop Rubber Company Limited, London, England, a company of Great Britain
No Drawing. Filed May 25, 1960, Ser. No. 31,566
Claims priority, application Great Britain, June 17, 1959, 20,710/59
12 Claims. (Cl. 260—41.5)

This invention relates to a process for the production of polymeric compositions and to vulcanised compositions made thereby.

Many polymeric substances can be obtained in a plastic state which renders them very suitable for the production of articles by moulding, pressing, or extrusion but the plasticity is undesirable in the finished article. One method of overcoming this disadvantage consists in mixing or compounding the polymer, prior to moulding, with a substance which hardens the polymer on heating, thereby rendering the finished article stronger and free from other undesirable properties such as tackiness. Such treatment is usually referred to as curing or vulcanisation.

It is an object of this invention to provide a process for the vulcanisation of polymers.

According to the present invention a process for the production of vulcanised polymeric compositions comprises heating an unvulcanised polymer which contains halogen atoms, hydroxyl groups, ester groups or at least 5 mole percent of unsaturated monomer units, in admixture with carbon black and a Friedel-Crafts type catalyst in an amount of up to 20 percent by weight of the polymer until the polymer is vulcanised.

The polymers which can be vulcanised according to the present invention are those containing groups which are known to react with aromatic hydrocarbons in the presence of Friedel-Crafts type catalysts. Suitable polymers are the unsaturated polymers, polymers containing halogen atoms, polymers containing hydroxyl groups and polymers containing ester groups. In the case of unsaturated polymers it is necessary for the polymer to contain at least 5 mole percent of the unsaturated monomer units. Examples of unsaturated polymers are natural rubber; polyisoprene; polybutadiene and copolymers of butadiene with styrene, acrylonitrile or methyl isopropenyl ketone. Examples of polymers containing halogen groups which can be cured are chlorinated polyethylene; chlorosulphonated polyethylene; chlorinated copolymers of ethylene and propylene; polychloroprene; polyvinyl chloride; copolymers of vinyl chloride with vinylidene chloride and copolymers of vinyl chloride with ethylene. Examples of polymers containing hydroxy groups are the polyglycols while examples of polymers containing ester groups are polyethylene adipate and polymethylmethacrylate.

The carbon black which is mixed with the polymer can be any of the known carbon blacks such as the furnace blacks, thermal blacks and channel blacks. Examples of furnace blacks are the super abrasion furnace blacks, high abrasion furnace blacks, fast extrusion furnace blacks and fine furnace blacks. Examples of channel blacks are the medium processing channel blacks, easy processing channel blacks and conducting channel blacks. Carbon black produced from acetylene and the various graphitized blacks may also be used.

The amount of carbon black which is mixed with the polymer may vary over wide limits. If a hard polymeric composition is required then a large amount of carbon black is usually used, but if a soft polymeric composition is required much less carbon black is necessary. However variations in hardness may be brought about by varying the vulcanisation time and temperature. For most purposes it is convenient to use from ten to one hundred and fifty parts by weight of black per one hundred parts by weight of polymer. Particularly useful compositions are obtained when from forty to sixty parts by weight of black are mixed with the polymer.

The Friedel-Crafts catalyst which is used depends on the nature of the polymer and on the black and it is desirable to use a more reactive type of catalyst for polymers which contain only a few reactive groups. For example, if the polymer has only a small amount of unsaturation then one of the highly reactive catalysts should be used are the metal halides, for example aluminium bromide, aluminium chloride, ferric chloride, zinc chloride, antimony pentachloride, stannic chloride, boron trifluoride, boron trichloride, tellurium dichloride and bismuth trichloride, and acids such as polyphosphoric acid and p-toluene sulphonic acid.

The Friedel-Crafts catalyst may be mixed with the polymer and carbon black in the form of a fine powder of the catalyst but preferably the catalyst is used in the form of a finely-divided chemical complex wherein the catalyst is combined with another compound. This complex compound must be chemically stable under the conditions apertaining when the polymer, carbon black and complex are mixed but it reacts with the polymer and black when the admixture is heated to effect vulcanisation.

The preferred complexes are those which consist of a Friedel-Crafts catalyst such as a metal halide e.g. aluminium chloride, aluminium bromide, ferric chloride, stannic chloride, boron trifluoride or tellurium dichloride in combination with an organic compound having the formula $R^1.X.R^2$ wherein X represents an atom of oxygen or sulphur or a carbonyl group and wherein $R^1$ and $R^2$ each represent an aliphatic group, e.g. an alkyl, alkenyl or alicyclic group, or an aromatic group, e.g. a phenyl group, or when taken together form a carbocyclic or heterocyclic ring system. Typical complexes are prepared by reacting the catalyst with the organic compound preferably in the presence of an organic solvent therefor, e.g. n-hexane. Examples of organic compounds which can be used to prepare the complex catalysts are dioxane, tetrahydropyran, tetrahydrofuran, trioxane, diisopropylether, cyclohexanone, methyl ethyl ketone, dibutyl sulphide and tetrahydrothiophen. It is preferred to use these complexes since they are less corrosive, less deliquescent and more readily dispersed in the polymer than the free catalysts. Also the complexes have a less tendency to cause the polymer to "scorch," i.e., to suffer pre-vulcanisation when the polymer, black and catalyst are mixed together, than the free catalysts.

Alternatively the catalyst may be incorporated in a molecular sieve which is then mixed with the polymer and carbon black and which liberates the free catalyst when the mixture is heated. If the free catalyst is used then it is often preferable to disperse this in an inert organic liquid before mixing with the polymer. By an "inert" organic liquid there is meant an organic liquid which does not react chemically with the catalyst. Such an inert organic liquid is a mineral oil, e.g. liquid paraffin.

The amount of free catalyst required depends on the amount of polymer and it has been found that sufficient catalyst is present to vulcanise the polymer and carbon black mixture if the amount used is from 0.2 percent to 20 percent by weight of the polymer. It is, however, preferred to use from 0.5 percent to 10 percent of catalyst. When the catalyst is used in the form of a complex or molecular sieve then amounts of these are used which contain between 0.2 percent and 20 percent, preferably between 0.5 percent and 10 percent based on the weight of polymer, of the catalyst.

Other vulcanizing agents in addition to the Friedel-Crafts catalysts may be present in the polymer mixture. Examples of such agents are sulphur and free-radical vulcanising agent, e.g., peroxides such as dicumyl peroxide, ditertiary butyl peroxide and tertiary butyl perbenzoate.

In carrying out the invention, the polymer, carbon black and catalyst are mixed together by conventional techniques, e.g., by milling and then shaped by moulding, extruding or other means, into the desired form. The compositions so obtained are vulcanised by heating to a temperature sufficient to bring about the desired cross-linking of the polymeric compositions and for a sufficient length of time until the properties of the vulcanised composition are at an optimum. It is usual to heat the compositions to a temperature between 80° C. and 250° C., preferably between 120° C. and 160° C. for a time of from 15 minutes to 100 minutes.

The polymeric composition may be shaped into articles such as shoe-soles, buckets, dust bins, mats or belts before being heated to effect the vulcanisation thereof.

The following examples illustrate the invention.

*Example I*

A complex catalyst was prepared from 5 grammes of aluminium chloride and 3.21 grammes of tetrahydropyran. The tetrahydropyran was added to a boiling slurry of aluminium chloride in n-heptane which was then refluxed for 1 hour. The solvent was then distilled from the slurry and the complex catalyst so obtained was dried in a vacuum to complete the removal of solvent.

One hundred grammes of a copolymer of 70 percent by weight of butadiene and 30 percent of styrene known as GRS rubber, were milled with 50 grammes of a high abrasion furnace black (HAF black) having a specific surface area of about 80 square metres per gramme and available under the trade name "Philblack O." The complex catalyst described above was then milled into the rubber composition which was then vulcanised in moulds at 140° C. for 40 minutes.

The samples of the vulcanised composition so obtained were tested and the physical properties are given below:

Modulus at 100% elongation _____ 1466
Tensile strength _____ 2133
Elongation at break (percent) _____ 160

The modulus and tensile strength are expressed in lb. per sq. in. The physical properties show clearly that the rubber composition had been vulcanised.

*Example II*

A complex catalyst was prepared from 7 grammes of aluminium chloride and 5.02 grammes of cyclohexanone by a method similar to that described in Example I.

The complex catalyst so obtained was milled into a mixture of GRS rubber and HAF black as described in Example I and vulcanised in moulds at 140° C. for 30 minutes.

The samples of vulcanised composition so obtained were tested and the physical properties are listed below:

Modulus at 100% elongation _____ 855
Tensile strength _____ 1855
Elongation at break (percent) _____ 230

The modulus and tensile strength are expressed in lb. per sq. in. The physical properties show clearly that the rubber composition had been vulcanised.

*Example III*

A complex catalyst was prepared from 9 grammes of aluminium chloride and 5.91 grammes of tetrahydrothiophen by a method similar to that described in Example I.

The complex catalyst so obtained was milled into a mixture of GRS rubber and HAF black as described in Example I and vulcanised in moulds at 140° C. for 30 minutes.

The samples of the vulcanised composition so obtained were tested and the physical properties are listed below:

Modulus at 100% elongation _____ 1015
Tensile strength _____ 1480
Elongation at break (percent) _____ 170

The modulus and tensile strength are expressed in lb. per sq. in. The physical properties show clearly that the rubber composition had been cured.

*Example IV*

This example illustrates vulcanising a chlorosulphonated polymer in the presence of a non-complexed Friedel-Crafts catalyst.

One hundred grammes of an unvulcanised chlorosulphonated polyethylene containing 27 percent by weight of chlorine and 1.5 percent of sulphur available under the trade name "Hypalon" and 50 grammes of the HAF black described in Example I were milled with 5 grammes of anhydrous ferric chloride. The composition so obtained was vulcanised in a mould at 120° C. for 30 minutes.

A sample of the vulcanised composition so obtained was tested and the physical properties are given below:

Modulus at 100% elongation _____ 755
Modulus at 200% elongation _____ 1145
Tensile strength _____ 1231
Elongation at break (percent) _____ 270

The modulus and tensile strength are expressed in lb. per sq. in.

These properties show clearly that the polymer had been vulcanised by heating in the presence of the ferric chloride.

*Example V*

This example illustrated vulcanising an unsaturated synthetic rubber with a non-complexed Friedel-Crafts catalyst.

Five grammes of aluminium chloride were ground in the presence of 2 grammes of liquid paraffin. The dispersion so obtained was milled into one hundred grammes of unvulcanised GRS rubber and 50 grammes of the HAF black described in Example I. The composition was vulcanised in a mould at 120° C. for 30 minutes.

A sample of the vulcanised composition so obtained was tested and the physical properties are given below:

Modulus at 100% elongation _____ 652
Tensile strength _____ 942
British Standard Hardness (degrees) _____ 70.5
Elongation at break (percent) _____ 150
Tear resistance measured at 21° C. _____ 242

The modulus and tensile strength are expressed in lb. per sq. in. and the tear resistance in lb. per in.

The physical properties show that the rubber composition had been vulcanised.

The vulcanised composition prepared in accordance with this example is suitable for use as shoe-soles and belting.

*Example VI*

One hundred grammes of an unvulcanised copolymer of ethylene and propylene in which the mole ratio of ethylene/propylene is 53/47 were dissolved in carbon tetrachloride. The solution so obtained was boiled under reflux and chlorine gas was passed into the solution until the copolymer was chlorinated to about 20 percent by weight. The carbon tetrachloride was then distilled from the solution. The chlorinated copolymer so obtained was mixed with 50 grammes of the HAF black described in Example I and 5 grammes of ferric chloride. The composition so obtained was vulcanised in moulds for 30 minutes at 120° C.

The physical properties of the vulcanised composition were evaluated and the results are listed below:

Modulus at 100% elongation _____ 537
Modulus at 200% elongation _____ 885
Modulus at 300% elongation _____ 1201
Tensile strength _____ 1320
Elongation at break (percent) _____ 400

The modulus and tensile strength are expressed in lb. per sq. in.

The physical properties show that the composition had been vulcanised.

*Example VII*

A complex catalyst was prepared from 9 grammes of aluminium chloride and 5.94 grammes of dioxane by a method similar to that described in Example I.

The complex catalyst so obtained was milled into a mixture of GRS rubber and HAF black as described in Example I and vulcanised in a mould at 140° C. for 45 minutes.

The sample of vulcanised composition so obtained was tested and the physical properties are listed below:

Modulus at 100% elongation _____ 580
Tensile strength _____ 1465
Elongation at break (percent) _____ 290

The modulus and tensile strength are expressed in pounds per square inch. The physical properties show clearly that the rubber composition had been vulcanised.

*Example VIII*

A complex catalyst was prepared from 9 grammes of aluminium chloride and 6.88 grammes of di-isopropyl ether by a method similar to that described in Example I.

The complex catalyst so obtained was milled into a mixture of GRS rubber and HAF black as described in Example I and vulcanised in a mould at 140° C. for 30 minutes.

The sample of vulcanised composition so obtained was tested and the physical properties are listed below:

Modulus at 100% elongation _____ 1232
Tensile strength _____ 2305
Elongation at break (percent) _____ 170

The modulus and tensile strength are expressed in pounds per square inch. The physical properties show clearly that the rubber composition had been vulcanised.

*Example IX*

A complex catalyst was prepared from 9 grammes of aluminium chloride and 9.85 grammes of dibutyl sulphide by a method similar to that described in Example I.

The complex catalyst so obtained was milled into a mixture of GRS rubber and HAF black as described in Example I and vulcanised in a mould at 140° C. for 30 minutes.

The sample of vulcanised composition so obtained was tested and the physical properties are listed below:

Modulus at 100% elongation _____ 246
Tensile strength _____ 348
Elongation at break (percent) _____ 290

The modulus and tensile strength are expressed in pounds per square inch. The physical properties show that the rubber composition had been vulcanised.

Having now described our invention, what we claim is:

1. A process for the production of a vulcanized polymeric composition containing carbon black in which the carbon black is bonded directly to the polymer which consists essentially in heating a vulcanizable polymer selected from the class consisting of unsaturated polyisoprene, unsaturated homopolymers of butadiene, unsaturated copolymers of butadiene with styrene, chlorine-containing homopolymers of dienes, in admixture with carbon black and a metal halide Friedel-Crafts catalyst in the form of a finely-divided chemical complex being the reaction product of the Friedel-Crafts catalyst with an organic compound having the general formula $R^1XR^2$ where X represents a member of the group consisting of an atom of oxygen, an atom of sulphur, and a carbonyl group, and wherein $R^1$ and $R^2$ each represent a member of the class consisting of aliphatic hydrocarbon and aromatic hydrocarbon groups, said Friedel-Crafts catalyst being present in an amount of from 0.2 percent to 20 percent by weight of the polymer.

2. A process for the production of a vulcanized polymeric composition containing carbon black in which the carbon black is bonded directly to the polymer which consists essentially in heating a vulcanizable polymer selected from the class consisting of polyisoprene, homopolymers of butadiene, copolymers of butadiene with styrene, chlorine-containing homopolymers of dienes, in admixture with carbon black and a metal halide Friedel-Crafts catalyst in the form of a finely-divided chemical complex being the reaction product of the Friedel-Crafts catalyst with an organic compound having the general formula $R^1XR^2$ wherein X represents a member of the group consisting of an atom of oxygen, an atom of sulphur, and a carbonyl group, and wherein $R^1$ and $R^2$ each represent an alkyl hydrocarbon group, said metal halide Friedel-Crafts catalyst being present in an amount of from 0.2 percent to 20 percent by weight of the polymer.

3. A process for the production of a vulcanized polymeric composition containing carbon black in which the carbon black is bonded directly to the polymer which consists essentially in heating a vulcanizable polymer selected from the class consisting of polyisoprene, homopolymers of butadiene, copolymers of butadiene with styrene, chlorine-containing homopolymers of dienes, in admixture with carbon black and aluminum chloride in the form of a finely-divided chemical complex being the reaction product of aluminum chloride with an organic compound having the general formula $R^1XR^2$ wherein X represents a member of the group consisting of an atom of oxygen, an atom of sulphur, and a carbonyl group, and wherein $R^1$ and $R^2$ each represent a member of the class consisting of aliphatic hydrocarbon and aromatic hydrocarbon groups, said aluminum chloride being present in an amount of from 0.2 percent to 20 percent by weight of the polymer.

4. A process for the production of a vulcanized polymeric composition containing carbon black in which the carbon black is bonded directly to the polymer which consists essentially in heating a vulcanizable polymer selected from the class consisting of polyisoprene, homopolymers of butadiene, copolymers of butadiene with a copolymerizable vinyl monomer containing at least 5 mole per cent of unsaturated monomer units, chlorine-containing homopolymers of dienes in admixture with carbon black and a metal halide Friedel-Crafts catalyst in the form of a finely-divided chemical complex with an organic compound having the general formula $R^1.X.R^2$, wherein X represents a member of the group consisting of an atom of oxygen, an atom of sulphur and a carbonyl group, and wherein $R^1$ and $R^2$ represent an alkenyl group, said metal halide Friedel-Crafts catalyst being present in an amount of from 0.2 percent to 20 percent by weight of the polymer.

5. A process according to claim 1 in which said metal halide Friedel-Crafts catalyst is ferric chloride.

6. A process according to claim 1 in which said vulcanizable polymer is a copolymer of butadiene and styrene.

7. A process according to claim 1 in which the amount of the metal halide Friedel-Crafts catalyst is from 0.5% to 10% by weight of the polymer.

8. A process according to claim 1 in which the amount of carbon black is from 10 to 150 parts by weight per 100 parts by weight of the polymer.

9. A process according to claim 1 in which the amount of the carbon black is from 40 to 60 parts by weight per 100 parts by weight of the polymer.

10. A process according to claim 1 in which the polymer is also heated in the presence of sulphur.

11. A process according to claim 1 in which the polymer is also heated in the presence of dicumyl peroxide.

12. A process according to claim 1 in which the polymer is heated to a temperature of 80° C. to 250° C.

References Cited by the Examiner

UNITED STATES PATENTS

| | | | |
|---|---|---|---|
| 2,721,185 | 10/55 | Schulze et al. | 260—33.6 |
| 2,739,462 | 3/56 | Ernst et al. | 260—41.5 |
| 2,952,657 | 9/60 | Serniuk | 260—41.5 |
| 2,963,462 | 12/60 | Braidwood | 260—41.5 |
| 2,965,600 | 12/60 | Minckler et al. | 260—41.5 |
| 3,028,358 | 4/62 | Rosamilia | 260—41.5 |

OTHER REFERENCES

"Anhydrous Aluminum Chloride in Organic Chemistry" (Thomas), Reinhold Publishing Corp., 1941, pages 48–54, 796 and 873–876 relied on. Call No. QD 262.T5.

"Introduction to Rubber Technology" (Morton), Reinhold Publishing Corp., 1959, pages 34 to 99 relied on. Call No. TS 1890 M 66.

MORRIS LIEBMAN, *Primary Examiner.*

DANIEL ARNOLD, LEON J. BERCOVITZ, *Examiners.*